Aug. 13, 1963   S. B. DISSON ET AL   3,100,869
PULSE REGENERATOR SYSTEM WITH FAULT LOCATION FACILITIES
Filed Nov. 3, 1961
3 Sheets-Sheet 1

INVENTORS.
STANLEY B. DISSON
ALBERT J. MEYERHOFF
BY  PAUL WINSOR III

Kenneth L. Miller
ATTORNEY

Fig. 4

United States Patent Office 3,100,869
Patented Aug. 13, 1963

3,100,869
PULSE REGENERATOR SYSTEM WITH FAULT LOCATION FACILITIES
Stanley B. Disson, Broomall, Albert J. Meyerhoff, Wynnewood, and Paul Winsor III, Paoli, Pa., assignors to Burroughs Corporation, Detroit, Mich., a corporation of Michigan
Filed Nov. 3, 1961, Ser. No. 149,898
16 Claims. (Cl. 325—38)

This invention relates to fault location devices and more particularly to fault location devices employed in unattended pulse regeneration stations.

It is well known that pulses when transmitted over long lines lose much of their shape and amplitude. It is also known that placing regeneration or repeater stations at intervals along the long line can overcome the difficulty of the deteriorated pulses. It is a definite advantage to be able to have such regenerator or repeater stations unattended. However, when such stations are unattended, the location of faults at one of the stations or between any two of them presents a problem.

It is therefore an object of our invention to provide a pulse regenerator which is unattended and which provides means for determining faults which are located at or between regenerators.

It is another object of our invention to improve regenerators which produce constant value output pulses from an input of deteriorated pulses.

It is another object of our invention to provide a regenerator system in which, when a fault occurs, the location of the fault can be quickly and easily determined.

It is another object of our invention to provide a pulse regenerator having the aforementioned characteristics which is compact and capable of withstanding comparatively rough use. It is likewise an object of our invention to provide an unattended pulse generator system requiring no local power source and therefore one which requires infrequent servicing and which is capable of readily locating faults along the line.

The above mentioned objects of our invention are obtained by providing between attended stations of a pulse regeneration system, a series of unattended stations, each having an open line detector and means for circulating a pulse in a loop comprising the east bound line up to the last unattended regenerator to the break, each of the unattended circuits up to the open line and the west bound line from the open circuit back to the attended station. When a single pulse is sent along the east bound line, each of the operating unattended regenerators will return the pulse through the west bound line and the operator at the attended station has merely to count the pulses returned to determine the number of unattended regenerators still in operation.

A typical cable system layout has unattended repeaters spaced at intervals of one-quarter mile with attended repeaters spaced about 33 miles. The unattended repeaters receive their power from the attended points over the cable phantom circuit. It is understood that the transmitted information is in practice pulse code modulated and may include a plurality of informational channels interlaced in the time division multiplexing process.

Other objects of our invention become apparent upon an understanding of the more specific description of the invention and the drawings in which:

FIG. 4 is a schematic of an alternative embodiment of our invention utilizing blocking oscillators rather than magnetic core pulse quantizers.

Figure 1:
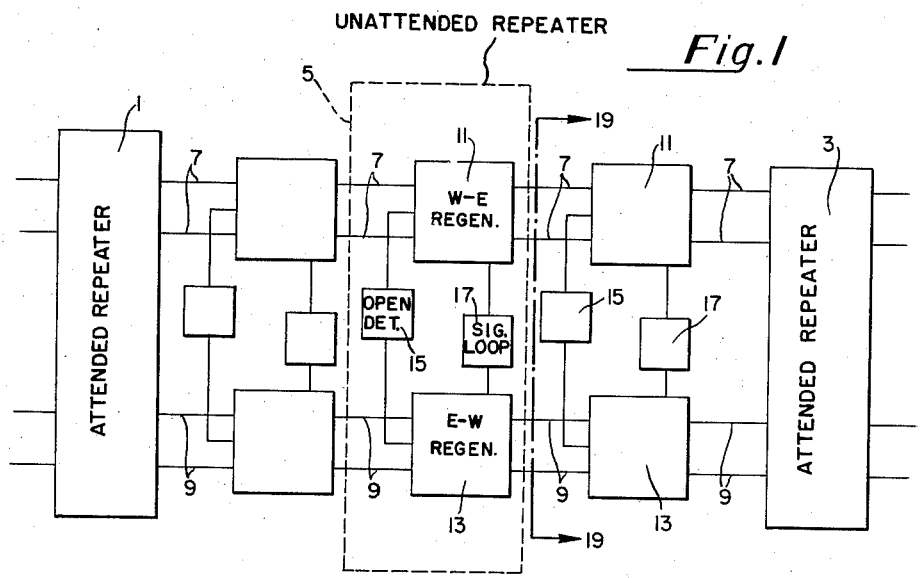
FIG. 1 is a block diagram of a complete regenerator system of the full duplex type which incorporates our invention.

In FIG. 1, attended repeater stations 1 and 3 are connected by a series of unattended repeater stations 5 and corresponding west-to-east lines 7 and east-to-west lines 9. The unattended repeater stations 5 are comprised of a west-to-east regenerator 11 and east-to-west regenerator 13, an open line detector 15 serving as direct current by-pass and a signal looping circuit 17.

In normal operation, pulses from the attended station 1 are passed through lines 7 and the west-to-east regenerators 11. Each of these regenerators accepts the deteriorated pulses from the line 7 immediately preceding it and reshapes the pulse to a definite form and subsequently sends the reshaped pulse through the line 7 following the regenerator toward the next repeater station and ultimately to the attended repeater station 3. Signals are likewise passed from the attended station 3 through the lines 9 and regenerators 13 to the attended repeater station 1.

In the event of a fault in the line, for instance, at the point 19—19, current which is supplied through a phantom power loop is reduced to zero. The cessation of current actuates the open line detector 15 in all of the repeater stations 5 preceding the open line. The open line detector also provides a power loop such that the current from the phantom circuit, which had previously been looped through all of the regenerators and the attended repeater station 3, is now through the open line detector of the last operating unattended repeater station from the west-to-east line 7 to the east-to-west line 9 and back to the attended repeater station 1. A power looping point may also normally be provided midway between attended stations in a manner hereinafter described.

At the time a fault is detected, an operator at the attended repeater station 1 momentarily reverses the power supply which in turn primes the signal looping circuit 17 of all of the unattended repeaters up to the unattended station at the point of the open line. After the signal looping circuits are primed, a single pulse is sent down the line from the attended repeater station 1. The signal looping circuit 17 of each of the unattended repeaters which were previously primed up to the point of the open line will in turn loop the pulse from the west-to-east line 7 to the east-to-west line 9 and subsequently back to the attended repeater station 1. The attendant at the attended repeater station 1 has merely to count the pulses returned by the east-to-west line 9 to determine the number of unattended repeater stations which have responded and consequently the fault will be localized just beyond those repeater stations.

Figure 2:
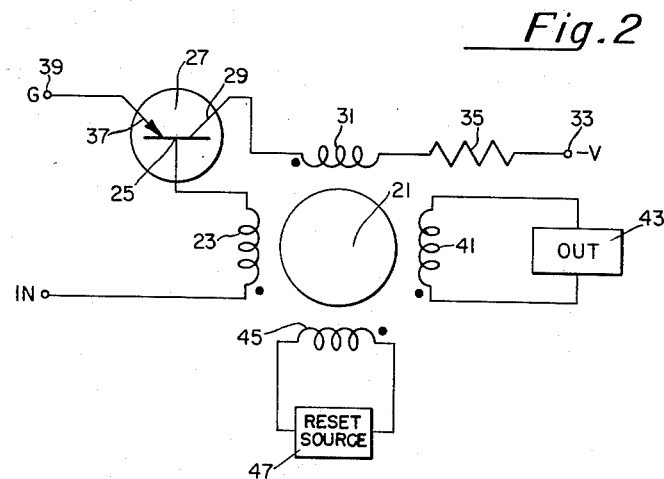
FIG. 2 is a schematic diagram of a transistor-magnetic core regenerator hereinafter referred to as a pulse quantizer.

FIG. 2 shows a type of pulse regenerator or pulse quantizer utilized in one embodiment of the invention. About the core 21 of substantially rectangular hysteresis loop material are placed four windings. The first winding 23, the input winding, is connected to the base 25 of transistor 27. The collector 29 of the transistor 27 is connected to the second winding 31. The other side of the winding 31 is connected to the source of negative voltage 33 through a current limiting resistor 35. The emitter 37 of the transistor 27 is connected to a source of potential 39 more positive than the negative potential 33. The output winding 41 is connected to the load device 43 and the reset winding 45 is connected to a source of direct current voltage 47 which may be either a fixed or a pulsed D.C. source.

In operation, upon receiving a pulse at the input driving the base negative, the transistor 27 begins to conduct and the collector current through the winding 31 begins to switch the core 21 in a direction opposite the normal direction which is obtained by the reset winding 45 and the D.C. voltage 47. The switching action is inductively coupled through the core 21 to the input winding 23 thereby creating a positive feedback and causing the transistor to be current saturated or "bottomed" almost instantly. During the switching operation, a voltage appears across the output winding 41 and ultimately at the load 43. Upon saturation of the core, the voltage which was originally fed back to the input winding fails and the collector current through the winding 31 begins to decrease turning off the transistor. Then, the D.C. voltage 47 applied to the winding 45 takes effect and switches the core back to its normal position. Consequently, regardless of the shape of the input pulse, a substantially rectangular pulse is obtained at the output winding 41 with its width controlled by the core characteristics.

Figure 3:
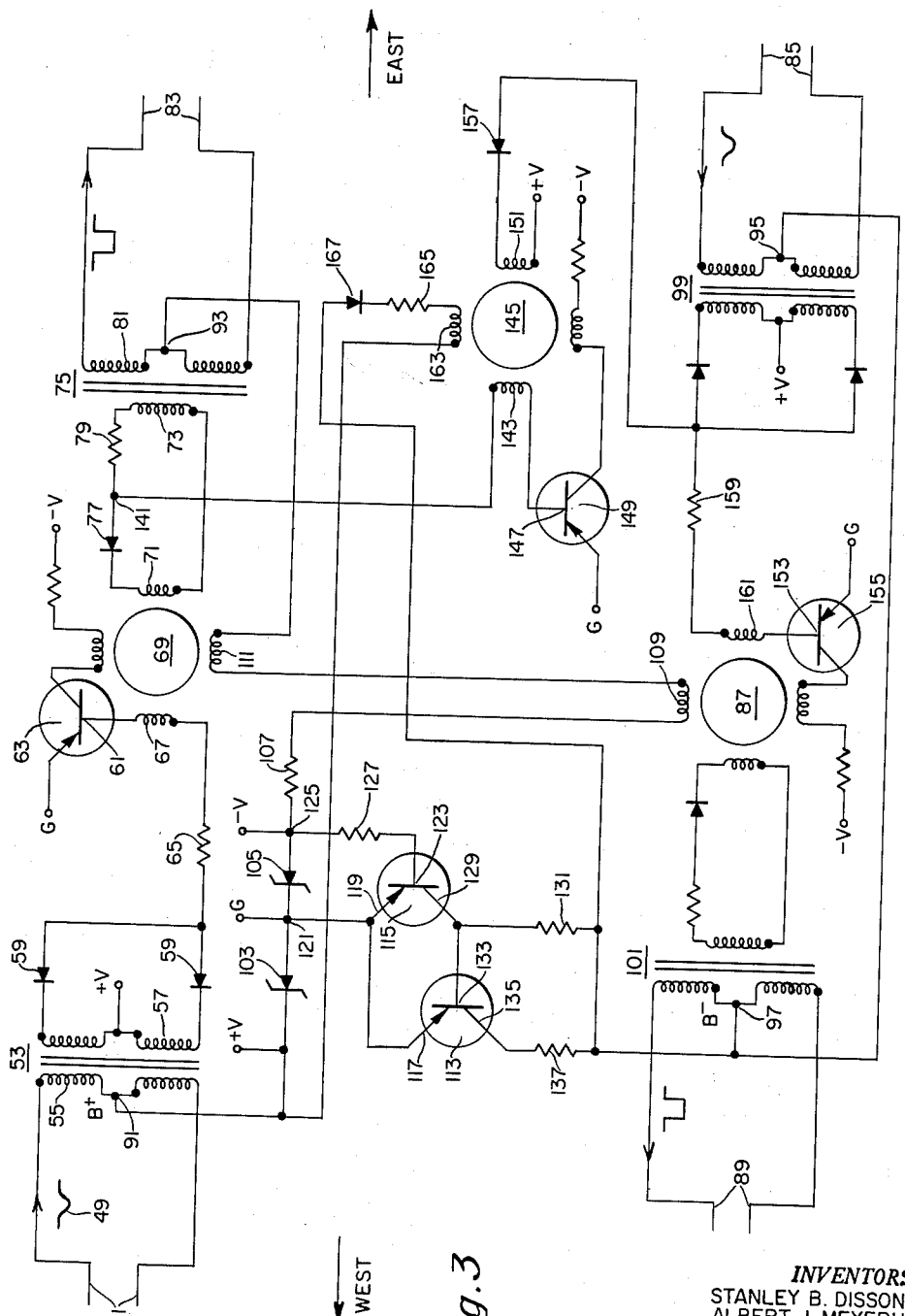
FIG. 3 is a schematic diagram of an unattended regenerator station utilizing pulse quantizers with fault location facilities.

FIG. 3 shows a complete unattended repeater station with the exception of an order wire circuit. An input pulse 49 from the west-to-east input line 51 is applied to transformer 53 having center tapped primary 55 and center tapped secondary 57. The ends of the secondary are joined together through opposing diodes 59 and the junction of the two is connected to the base 61 of transistor 63 through a current limiting resistor 65 and an input winding 67 of a pulse quantizer 69, as previously described. The center-tapped secondary 57 and two diodes 59 are required at the transformer 53 only when the polarity of the individual conductors of a cable pair is unknown. Otherwise a single secondary winding could be used without a diode. The output winding 71 of the quantizer 69 is connected to the primary winding 73 of the transformer 75 through a diode 77 and resistor 79. The center tap of the secondary winding 81 of the transformer 75 is connected to the west-to-east output line 83. The east-to-west input line 85 is similarly connected through a quantizer 87 to the east-to-west output line 89.

Direct current is applied to the circuit through a phantom loop and connections are made at the center taps 91, 93, 95 and 97 of the transformers 53, 75, 99 and 101 respectively. In the west-to-east line, connection is made from the center tap 91 to the center tap 93 through zener diodes 103 and 105, resistor 107, and reset windings 109 and 111 of quantizers 87 and 69 respectively. In the east-to-west line, center tap 95 is directly connected to center tap 97.

In a typical system, there may be 80 repeaters in a series loop with a 400 volt direct current power supply furnishing 50 milliamps. as power for the unattended repeaters which derive their operating power from the attended station. It is oftentimes convenient to provide a power looping point midway between attended stations simply by connecting the west-to-east center-tapped output of a transformer 75 of the east-to-west center-tapped input of a transformer 99. In this manner, an attended station may supply direct current power in both directions to the unattended stations to respective mid-points between attended stations. Depending upon the technique used for obtaining the order wire channel, two isolating transformers may be necessary at looping points.

The open line detector circuit is comprised of two transistors 113 and 115. The emitters 117 and 119 of the transistors 113 and 115 are connected to the junction 121 of the two zener diodes. The base 123 of transistor 115 is connected to the junction 125 of the zener diode 105 and the resistor 107 through the resistor 127. The collector 129 of the transistor 115 is connected to the center tap 97 of the transformer 101 through the current limiting resistor 131. The collector 129 is also connected to the base 133 of the transistor 113. The collector 135 of transistor 113 is connected to the center tap 97 through the current limiting resistor 137.

For the pulse looping circuit, the junction 141 of the diode 77 and resistor 79 is connected through the input winding 143 of the quantizer or regenerator 145 to the base 147 of the transistor 149. The output winding 151 of quantizer 145 is connected to the base 153 of the transistor 155 through the diode 157, resistor 159 and the input winding 161 of quantizer 87. The reset winding 163 of quantizer 145 is connected on one side directly to the center tap 91 of the transformer 53 and is connected to the center tap 93 of the transformer 75 through the resistor 165 and diode 167. The three junctions at zener diodes 103 and 105 are indicated as possessing relatively +V, reference potential G, and —V due to the constant voltage drops normally resulting from current flow through the direct current phantom circuit. These relative voltages serve as the power supply for the respective unattended stations. Direct current power is applied through a phantom loop utilizing the center taps of the input and output transformers. In normal operation, the D.C. current which all of the regenerators use is passed through zener diodes 103 and 105 of each of the individual unattended repeater stations. The voltage drop across each zener diode is a constant value due to the nature of the diode itself.

In normal operation upon receiving a coded pulse 49 at the primary 55 of the transformer 53, a negative pulse is advanced to the base 61 of the transistor 63 of the quantizer 69. Quantizer 69 operates as explained above and the resultant output pulse having been reshaped is advanced along the west-to-east output line 83 toward the next repeater station. At the same time, pulses may be received on the east-to-west input line 85, reshaped by the quantizer 87 and advanced on the east-to-west output line 89.

During normal operation, the voltage drop across the zener diode 105 is applied between the base 123 and emitter 119 of the transistor 115 thereby causing collector current to flow through the resistor 131 to the center tap 97 of the transformer 101. Particularly when transistor 115 is saturated, this current causes the base 133 and emitter 117 of the transistor 113 to be effectively shorted out thereby preventing that transistor from conducting. The resistor 131 is of relatively high value so as to minimize the current drain from the center tap 91 in the west-to-east line to the center tap 97 in the east-to-west line.

In the event an open line occurs at a point east of the regenerator, the normal D.C. current through the phantom loop will be eliminated and consequently the voltage across the zener diode 105 will be reduced to zero. This will in turn cut off the collector current of the transistor 115 and the base 133 and emitter 117 of the transistor 113 will no longer be effectively short-circuited. At this time, transistor 113 will begin to conduct due to the negative supply path through resistor 131 to the base 133 and collector current will flow through the resistor 137 to the center tap 97 of the transformer 101. The value of the resistor 137 is fixed such that the collector current of the transistor 113 in any given unattended repeater station must be sufficient to supply the D.C. requirements of all the previous unattended repeater stations, that is, all of the unattended repeaters from the point of the break westward to the next attended station.

When the fault is realized at the attended repeater station west of the break, the attendant momentarily reverses the D.C. power supply. This reversal allows the current to flow through the reset winding 163 of the quantizer 145 through the resistor 165 and the diode 167 thus priming the quantizer 145 in each of the westward unattended stations. After the power supply is returned to its normal condition, a single pulse 49 is advanced along the west-to-east line 51. The voltage on the output winding 71 of the quantizer 69 will be applied not only along the still operating output west-to-east lines 83 but also to the input winding 143 of the quantizer 145. Since quantizer 145 has been primed in those still operating westward stations, an output pulse will appear on the output winding 151 and will be advanced to the input winding 161 of the quantizer 87 through diode 157 and resistor 159. Quantizer 87 will regenerate the pulse and advance it along the east-to-west line output 89.

This sequence of events will occur in each of the operating unattended repeater stations up to the point of the open line and consequently, a pulse will be received at the attended repeater station westward of the open line from each of such operating unattended repeater stations. The number of pulses received at the attended station will be dictated by the number of unattended repeater stations still in service. By counting these pulses, the attendant can determine the location of the open line or that the unattended repeater following the last operating unattended repeater is inoperative.

Figure 4:
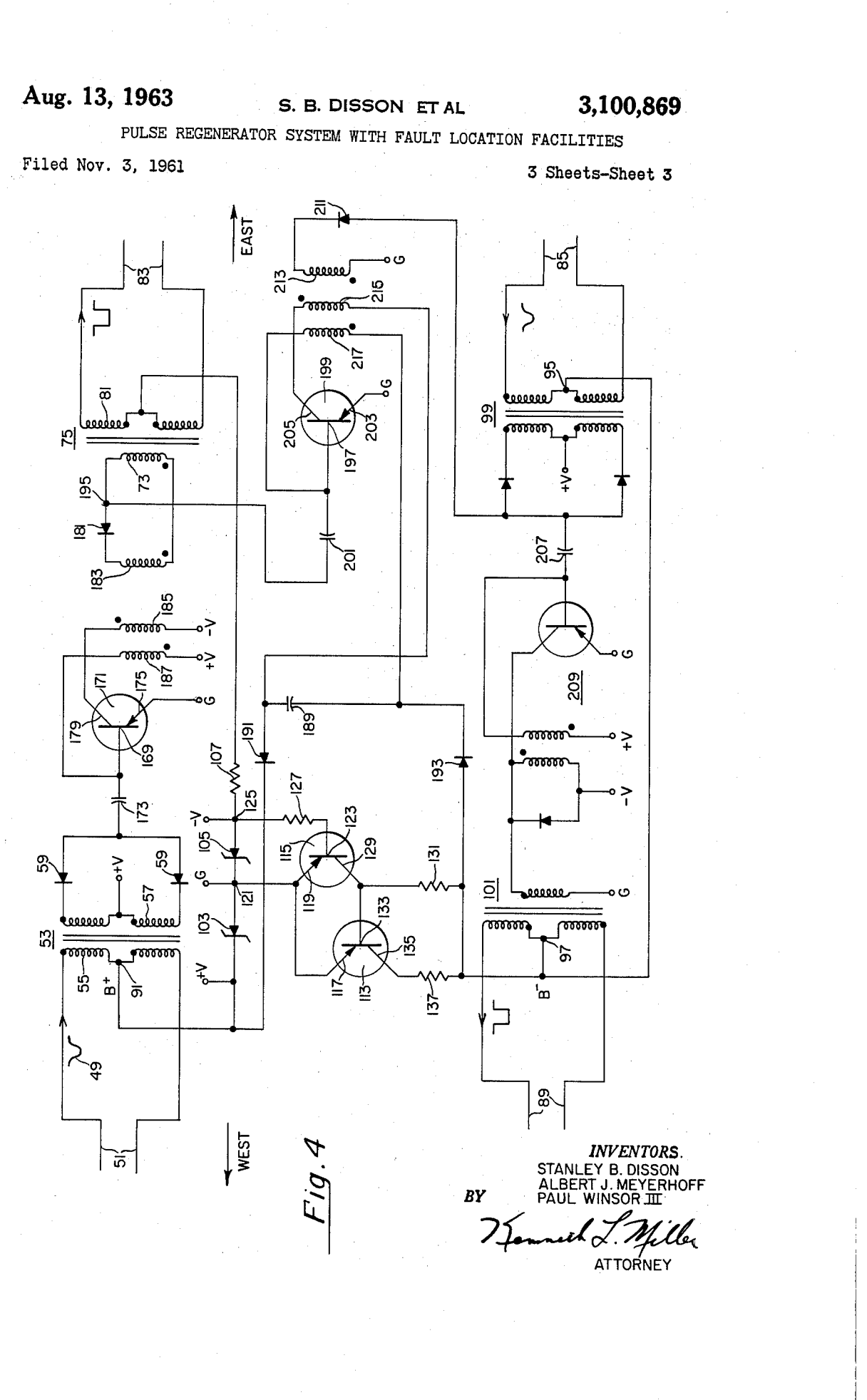

FIG. 4 shows an embodiment of the invention utilizing blocking oscillators instead of the pulse quantizing circuits described above. In this case, the pulse 49 is applied through a similar transformer 53 to the base 169 of transistor 171 through coupling capacitor 173. The emitter 175 of the transistor 171 is connected to the source of reference potential G. The collector 179 is connected to the source of negative potential −V through transformer winding 185. In an inductive coupled relationship with the winding 185 is the winding 187 which is connected from a source of positive potential +V to the base 169 of the transistor 171. Winding 183 is also inductively coupled to winding 185 and connects to the opposite ends of primary 73 of transformer 75 through a diode 181. The windings 185 and 187 are coupled such as to provide positive feedback to the transistor 171. The secondary 81 of the transformer 75 is connected to the west-to-east output line 83.

The east-to-west input line 85 is connected to the east-to-west input line 89 in similar fashion. The open line detection is identical to that used in the regenerator with the quantizer as described with reference to FIG. 3.

A capacitor 189 is connected to the center tap 91 through the diode 191. The other side of the capacitor is connected to the center tap 97 through the diode 193. The junction 195 between diode 181 and the winding 73 is connected to the base 197 of the transistor 199 through the coupling capacitor 201. The emitter 203 of the transistor 199 is connected to the nominal ground potential G. Secondary winding 213 is connected to the input coupling capacitor 207 of the blocking oscillator 209 through diode 211. Connected to the collector 205 of transistor 199 is the winding 215 with its other end connected to the junction of the capacitor 189 and the diode 191. The winding 217 is inductively coupled to the winding 215 and is conected on one side to the base 197 of the transistor 199. The other side of the winding 217 is connected to the junction of the capacitor 189 of the diode 193. The windings 215 and 217 are coupled such as to provide positive feedback to the transistor 199.

In operation, the provision of D.C. voltage in this circuit is similar to that in the preceding circuit. Upon receiving a negative pulse 49 at the primary 55 of the transformer 53 a pulse is advanced from the secondary 57 through the capacitor 173 to the base 169 of the transistor 171. The negative pulse at the base 169 causes collector current to flow in transistor 171 through the coil 185. By induction in the coil 187 a positive feedback is obtained and the base 169 is made even more negative. This cycle repeats itself until the transistor reaches its saturation current and can no longer sustain the inductive coupling for feedback. Upon the slightest diminishing of the collector current, a positive voltage will be applied to the base 169 thereby causing a further decrease in the collector current. This cycle also repeats itself rapidly until the transistor is cut off.

During this time, the output of the circuit is applied through the diode 181 to the primary 73 of the transformer 75. From the secondary 81 of the transformer 75 the pulse is advanced along the west-to-east output line 83. Pulses are also advanced from the east-to-west input line 85 to the east-to-west output line 89 by a similar operation.

The open line detector circuit of FIG. 4 is constructed and operates exactly as that described in FIG. 3.

When the operator momentarily reverses the polarity of the power supply, the capacitor 189 is charged through the diodes 191 and 193 causing a negative voltage to be impressed on the plate adjacent the diode 191. Thereafter, when the power supply is at normal polarity again, and a single pulse is advanced along the west-to-east input line 51, the output at the junction 195 will be applied to the base 197 of the transistor 199. Since the emitter 203 is connected to a nominal ground potential G and the collector 205 to the negatively charged side of the capacitor 189 through the winding 215, collector current begins to flow through the winding 215 to the capacitor 189. Positive feedback is provided through the winding 217 to the base 197 and the circuit operates as a blocking oscillator with its output being advanced to the input capacitor 207 through diode 211 where it initiates another blocking oscillator cycle and is advanced along the east-to-west output line 89. This action, of course, only results in those fully operating stations west of the line break.

The value of the capacitor 189 must be such as to provide sufficient energy to activate the blocking oscillator 209. If, after the initiation of the blocking oscillator 209, the capacitor 189 is still partially energized, the charge can be reduced by additionally single pulses along the west-to-east line 51 once the returned pulses have been counted.

Instead of the pulse quantizers or blocking oscillators, the invention can be accomplished by the use of multivibrators or any other two state devices with facility for priming those units still in the operating portion of the line followed by a single requesting pulse. In the event a positive pulse is required, transformer connections can be changed or NPN transistors rather than the PNP type can be used. Furthermore, although the arbitrary directions of "east" and "west" have been used throughout, it is understood that any appropritte two directional path is intended.

What is claimed is:
1. In a cable system for communication by trains of "on" and "off" pulses,
(a) a west-to-east repeater for reshaping incoming pulses comprising a pulse quantizer including
(b) a magnetic core having a set and a reset stable condition,
(c) an input, load, and reset winding coupled to said core,
(d) an output circuit coupled to said quantizer,
(e) a transistor having an emitter, collector and base electrode,
(f) first means connecting said load winding in the emitter-collector circuit of said transistor,
(g) second means connecting said input winding in the base circuit of said transistor,
(h) an input line and an output line,
(i) coupling means for providing an input signal pattern of "on" and "off" pulses to the base electrode of said transistor causing said transistor to saturate and by virtue of a regeneration between said load and input windings to cause said core to change to its set condition in response to "on" pulses,
(j) reset circuit means connected to said reset winding causing said core to reset intermediate the pulses of said signal pattern whereby a regenerated signal pattern is developed along said output circuit to said output line.
2. In a system as defined in claim 1,
(a) an east-to-west repeater comprising a second pulse quantizer having a separate input and output line.
3. In a system as defined in claim 2,

(a) a remotely located direct current power source for providing localized voltage at each of said pulse quantizers through a series connected phantom loop through the input and output lines of each repeater.

4. In a system as defined in claim 3,
(a) an open line detector circuit for sensing an open line and for providing a current by-pass path from said west-to-east line to said east-to-west line at the repeater adjacent to said open line in order to maintain a series connected loop westward of said open line.

5. In a system as defined in claim 4,
(a) wherein said open line detector comprises a two transistor arrangement having two stable states with one or the other transistor in a conducting condition and
(b) series current sensing means for causing said two transistors to reverse their conducting conditions in response to an opening of said line.

6. In a system as defined in claim 4,
(a) a signaling device associated with each repeater with
(b) means causing each signaling device westward of the broken line to return a signal upon being interrogated in order to locate the position of such line fault.

7. In a pulse code modulated system for communication over cables,
(a) a regeneration station having an open line detector connected across two lines, said two lines respectively carrying pulse coded signals in a first and a second direction,
(b) a remotely located direct current power source for providing localized voltage at each regeneration station through a series connected loop including said two lines,
(c) means diverting current through said open line detector to maintain a closed series loop when an open appears in at least one of said lines just beyond said regeneration station.

8. In a pulse code modulated system as defined in claim 7,
(a) a signaling device associated with said regeneration station,
(b) means for priming and for interrogating said signaling device to cause a return signal from each primed repeater station on the unbroken side of said lines.

9. In a pulse code modulated system as defined in claim 8,
(a) wherein said means for priming said signaling device includes means at each regeneration station responsive to a momentary reversal of the polarity of the remotely located direct current power source.

10. In a pulse code modulated system as defined in claim 9,
(a) wherein said means for interrogating said signaling device includes means responsive to a single incoming pulse only after said signaling device has been primed.

11. In a pulse code modulated system as defined in claim 8,
(a) wherein said signaling device comprises a pulse quantizer including a magnetic core having a set and a reset state and
(b) winding means causing said core to be driven to said set state in response to a priming pulse and to be changed to said reset state in response to an interrogating pulse.

12. In a pulse code modulated system as defined in claim 8,
(a) wherein said signaling device comprises a blocking oscillator including a transistor with emitter, base, and collector electrode,
(b) a capacitor charged by said priming means and serving as a voltage supply source for said transistor, and
(c) coupling means for firing said blocking oscillator in response to an interrogating pulse.

13. A pulse code modulated repeater for two way communication comprising
(a) a first and second line,
(b) a first pulse regenerator associated with said first line and a second pulse regenerator associated with said second line,
(c) a remotely located power source for providing localized operating energy at said two regenerators and arranged in a closed series direct current loop including said first and second lines,
(d) an open line detector connected across said two lines,
(e) means diverting current through said open line detector to maintain a closed series loop when an open appears on at least one of said lines,
(f) an AND gate,
(g) priming means for providing one input to said AND gate when said open appears and
(h) means providing a second input to said AND gate to return an output along said second line to said remote location whereby operating repeaters may be identified in order to locate the position of said open in said lines.

14. A pulse code modulated repeater as recited in claim 13,
(a) wherein said open line detector comprises a pair of transistors with one of said transistors normally conducting a stand-by amount of current thereby maintaining the other of said transistors cut-off and
(b) with means enabling said other transistor when said one transistor cuts off in response to an open in said lines.

15. A pulse code modulated repeater as recited in claim 13,
(a) wherein said AND gate comprises a magnetic core circuit including a set and reset state and
(b) wherein said priming means sets said core in order to provide an output in response to a subsequent resetting interrogating pulse sent along said first line.

16. A pulse code modulated repeater as recited in claim 13,
(a) wherein said AND gate comprises a blocking oscillator with a capacitor charged by said priming means and serving as an energy source for said blocking oscillator to provide an output when a further interrogating pulse is sent along said first line.

No references cited.